US012669777B2

(12) United States Patent
Mills et al.

(10) Patent No.: US 12,669,777 B2
(45) Date of Patent: Jun. 30, 2026

(54) METHOD FOR PRODUCING VOLUME REFLECTION HOLOGRAMS WITH SUBSTRATE-GUIDED RECONSTRUCTION BEAMS AND/OR SUBSTRATE-GUIDED DIFFRACTED BEAMS IN A SINGLE-BEAM SET-UP

(71) Applicants:Covestro LLC, Pittsburgh, PA (US); Covestro Deutschland AG, Leverkusen (DE)

(72) Inventors: Jack Mills, Pittsburgh, PA (US); Friedrich-Karl Bruder, Krefeld (DE); Johannes Frank, Cologne (DE)

(73) Assignees: Covestro LLC, Pitsburgh, PA (US); Covestro Deutschland AG, Leverkusen (DE)

( * ) Notice: Subject to any disclaimer, the term of this patent is extended or adjusted under 35 U.S.C. 154(b) by 254 days.

(21) Appl. No.: 18/721,519

(22) PCT Filed: Dec. 13, 2022

(86) PCT No.: PCT/EP2022/085502
§ 371 (c)(1),
(2) Date: Jun. 18, 2024

(87) PCT Pub. No.: WO2023/117562
PCT Pub. Date: Jun. 29, 2023

(65) Prior Publication Data
US 2025/0060702 A1 Feb. 20, 2025

Related U.S. Application Data

(60) Provisional application No. 63/293,042, filed on Dec. 22, 2021.

(30) Foreign Application Priority Data

Jan. 31, 2022 (EP) ..................................... 22154173

(51) Int. Cl.
*G03H 1/02* (2006.01)
*G03H 1/04* (2006.01)

(52) U.S. Cl.
CPC ......... *G03H 1/0248* (2013.01); *G03H 1/0272* (2013.01); *G03H 1/0402* (2013.01);
(Continued)

(58) Field of Classification Search
CPC .. G03H 1/0248; G03H 1/0272; G03H 1/0402; G03H 1/0408; G03H 2001/0415
See application file for complete search history.

(56) References Cited

U.S. PATENT DOCUMENTS

| | | | | |
|---|---|---|---|---|
| 2001/0053004 | A1* | 12/2001 | Nishikawa | ............... G02B 5/32 |
| | | | | 349/64 |
| 2007/0024939 | A1 | 2/2007 | Harris | |
| 2019/0011880 | A1 | 1/2019 | Rewitz et al. | |

FOREIGN PATENT DOCUMENTS

| | | | |
|---|---|---|---|
| EP | 0821293 | A2 | 1/1998 |
| WO | 2017108704 | A1 | 6/2017 |

* cited by examiner

*Primary Examiner* — Paisley L Wilson
(74) *Attorney, Agent, or Firm* — The Webb Law Firm

(57) ABSTRACT
The disclose relates to a method for producing volume reflection holograms with substrate-guided reconstruction beams and/or substrate-guided diffracted beams in a single-beam set-up, including the steps of (i) providing at least one laser beam source producing a recording beam having a first wave vector (ii) providing a holographic recording medium on a transparent substrate, the substrate having a first flat side facing the at least one laser beam source and a second flat side facing away from the at least one laser beam source, where the holographic recording medium is arranged on the first flat side or on the second flat side, (iii) providing a reflector arrangement arranged on the second flat side of the substrate.

15 Claims, 7 Drawing Sheets

(52) U.S. Cl.
CPC ... *G03H 1/0408* (2013.01); *G03H 2001/0415* (2013.01); *G03H 2222/16* (2013.01); *G03H 2223/24* (2013.01)

METHOD FOR PRODUCING VOLUME REFLECTION HOLOGRAMS WITH SUBSTRATE-GUIDED RECONSTRUCTION BEAMS AND/OR SUBSTRATE-GUIDED DIFFRACTED BEAMS IN A SINGLE-BEAM SET-UP

CROSS-REFERENCE TO RELATED APPLICATIONS

This application is the United States national phase of International Patent Application No. PCT/EP2022/085502 filed Dec. 13, 2022, and claims priority to U.S. Provisional Patent Application No. 63/293,042 filed Dec. 22, 2021, and European Patent Application No. 22154173.3 filed Jan. 31, 2022, the disclosures of which are hereby incorporated by reference in their entireties.

BACKGROUND

Technical Field

The invention relates to a method for producing volume reflection holograms with substrate-guided reconstruction beams and/or substrate-guided diffracted beams in a single-beam set-up. Furthermore, the invention relates to an apparatus for producing volume reflection holograms with substrate-guided reconstruction beams and/or substrate-guided diffracted beams in a single-beam set-up.

Volume holograms, which are also referred to as thick holograms in the literature, are used in many optical applications, such as display applications. According to the definition of the volume hologram, the thickness thereof is much greater than the wavelength of light used for recording the hologram. The volume hologram is a light-diffracting holographic optical element (HOE) based on a light-transmissive medium, which, as a phase or absorption grating, was written into the volume of the holographic recording layer. Reflection volume holograms, where the object and reference beams are incident on the holographic recording medium from opposite sides, in particular, are relevant to this application.

Description of Related Art

Typical recording media for volume holograms are metal halide emulsions, dichromated gelatin, photopolymers and photochromic materials. Their functionality, chemical composition and applications are described in the literature ["Optical holography", by P. Hariharan, Cambridge University Press (1996), ISBN 0 521 43348 7].

From the aforementioned document, for example, it is known to use a beam splitter to divide or guide a collimated laser beam in two separate object and reference beam paths. Further optical elements, such as lenses, spatial filters, etc., can be used in order to e.g. widen and/or homogenize the partial beams and/or to establish the desired wavefronts. The object to be recorded in the recording medium as a hologram, which is also referred to as a master element, is illuminated by the object beam and diffracts light in the direction of the holographic recording medium. By way of example, the holographic recording medium can be a photographic plate. Said plate is positioned within the apparatus, in particular at a location where the two partial beams are made to interfere.

EP 0 821 293 B1 discloses a hologram colour display medium and method for fabricating such display medium.

According to an embodiment shown in FIG. 22 of EP 0 821 293 B1 a volume hologram photosensitive material is positioned in proximity to the surface of a reflector having a plurality of micro-mirrors. A light beam is permitted to strike on the hologram photosensitive material, whereupon the light beam passes through the hologram photosensitive material, and is reflected at the surface. The reflected light and the incident light interfere in the hologram photosensitive material to record interference fringes varying per position therein. Due to the existence of an air gap between the volume hologram photosensitive material and the reflector containing the plurality of micro-mirrors the setup described in EP 0 821 293 B1 is not usable for the production of volume reflection holograms with substrate-guided reconstruction beams and/or substrate-guided diffracted beams and therefore describes an alternative approach that cannot be applied to solve the object of the present invention.

SUMMARY

Substrate-guided reconstruction beams and/or substrate-guided diffracted beams propagate via total internal reflection (TIR) inside the medium because the reconstruction angle or the diffracted beam angle, respectively, is greater than the critical angle $\theta_c$. Substrate-guided reconstruction beams and/or substrate-guided diffracted beams are characteristic for, in particular, compact optical setups, in which the light source is coupled in through a thin waveguide or a light-guiding plate (lightguide) and decoupled into "free-space" by a volume hologram positioned on the lightguide or in which the reconstruction beam is coupled into a lightguide by means of an coupling hologram and propagates through the lightguide as a substrate-guided diffracted beam.

For near-eye display applications and in particular augmented reality smart glasses the eye-box size is a critical component of mass adoption for the technology. Lightguide based optical architectures for augmented reality near-eye display applications offer clear advantages in eye-box expansion techniques.

For mass manufacturing of volume reflection holograms with substrate-guided reconstruction beams and/or substrate-guided diffracted beams a single-beam setup can be used if the object or master element is, in particular, a master hologram, of which a copy is intended to be produced. Document US 2007/024939 A discloses an apparatus in various embodiments, in which hologram copies can be produced in a semi to fully automatic manner by means of the conveying device.

However, the fabricating of volume reflection holograms for coupling an image into a lightguide is a traditionally challenging topic for mass manufacturing, due to the phenomenon of total internal reflection (TIR) that makes it well suited for eye-box expansion. In a straightforward approach where the volume reflection hologram is recorded using the desired playback angles (with some compensation for photopolymer shrinkage), an index matching medium is required to record the desired propagation angle above the critical angle in the medium and prevent unwanted spurious gratings. WO2017/108704 A1 discloses a method and an apparatus for the manufacture volume reflection holograms for substrate-guided reconstruction beams which can be used in the mass manufacturing of such holograms. Here, the use of index matching mediums presents significant challenges for process stability even if a contact copy scheme utilizing a master hologram can be used.

Techniques to overcome the use of index matching mediums are known to exist with some range of limited applicability to volume reflection holograms with substrate-guided reconstruction beams and/or substrate-guided diffracted beams. These techniques rely on optimizing a parameter space using recording angles, recording wavelength, or both to fabricate a volume reflection holograms using recording angles that do not require the use of index matching mediums. Physically, this amounts to conserving the grating vector of the desired playback geometry using a more desirable recording geometry, a technique traditionally referred to as Bragg Matching. This problem becomes even more complex when multiple volume reflection holograms need to be recorded in single or multiple photopolymer layer(s), with the same playback geometry (colinear aligned reconstruction beams), and different wavelength sensitivities. Typically, still a two-beam recording setup is necessary with all its difficulties related to process stability and, in particular, vibrations.

To overcome the difficulties identified in the prior art it is an object of the present invention to provide a method and an apparatus for producing volume reflection holograms with substrate-guided reconstruction beams and/or substrate-guided diffracted beams in a single-beam set-up that is not reliant on the use of an index matching medium and fully usable in the mass manufacture of such holograms.

This object and other objects are achieved in accordance with a first aspect of the present invention by a method for producing volume reflection holograms with substrate-guided reconstruction beams and/or substrate-guided diffracted beams in a single-beam set-up comprising the following steps:

providing at least one laser beam source producing a recording beam having a first wave vector, providing a holographic recording medium on a transparent substrate, the substrate having a first flat side facing the at least one laser beam source and a second flat side facing away from the at least one laser beam source, wherein the holographic recording medium is arranged on the first flat side or on the second flat side, providing a reflector arrangement arranged on the second flat side of the substrate, wherein the recording beam irradiates the holographic recording medium, wherein the recording beam passes through the holographic recording medium and the substrate, and is reflected by the reflector arrangement towards the holographic recording medium and the substrate as a reflected beam having a second wave vector, wherein the reflected beam produces an interference pattern with the recording beam in the holographic recording medium, the interference pattern having the form of a grating having a grating vector, the grating vector being the difference vector of the wave vector of the reflected beam and the wave vector of the recording beam and the grating vector also being identical to the difference vector of the wave vector of the diffracted beam and the wave vector of the reconstruction beam, and wherein a first plane spanned by the recording beam and the reflected beam is different from a second plane spanned by the reconstruction beam and the diffracted beam and wherein the grating vector of the grating is parallel to the line of intersection of the first and the second plane.

The method according to the invention uses a single-beam setup where the recording beam produces an interference pattern in the holographic recording medium with the reflected beam which is a reflection of the recording beam after the recording beam having passed the holographic recording medium. This single-beam setup that is not reliant on a master hologram is particularly useful where the respective wavefront of the recording beam and of the reflected beam has a simple shape, e.g. plane or spherical.

The main advantage of the method according to the invention is that by following the principle found by the inventors according to which a first plane spanned by the recording beam and the reflected beam is different from a second plane spanned by the reconstruction beam and the diffracted beam and wherein the grating vector of the grating is collinear with the line of intersection of the first and the second plane the user achieves maximum flexibility in the manufacturing process. This, inter alia, allows the user to no longer be dependent on the use of an index matching medium in order to achieve an angle in the lightguide that is above the critical angle in order to ensure light propagation in the lightguide by TIR. The large gain of flexibility in the recording of the gratings in the holographic recording medium, preferably a photopolymer, relates to both the orientation of the recording beam and the reflected beam in relation to the holographic recording medium and the wavelength of the recording beam. For example, any desired angle of propagation parallel to the surface of a lightguide can be achieved by a simple rotation of the holographic recording medium after recording. The same holds for any arbitrary angles of diffraction for the diffracted beam in free-space as well. The method according to the invention can be fully described by the formalism of energy and momentum conservation. Small corrections due to mechanical and optical changes of a holographic medium can easily be incorporated, for example, shrinkage in photopolymer systems and change in average refractive index due to recording and bleaching.

According to a first embodiment of the present invention the reflector arrangement comprises at least two reflecting elements. Thus, it is possible to align the recording beam and the reflected beam in a conformal orientation with respect to each other.

According to a further embodiment of the present invention the beam path of the recording beam and the beam path of the reflected beam are arranged in a "free-space" configuration in air or in vacuum. This represents the simplest setup and ensures a cost-efficient manufacturing of the volume reflection holograms.

In a further, alternative embodiment of the present invention the holographic recording medium is arranged on the second flat side of the substrate facing away from the at least one laser beam source and the reflector arrangement is formed by a beam-guiding block, wherein the beam-guiding block is transparent for the recording beam and has a first facet two-dimensionally contacting the holographic recording medium and at least two further facets reflecting the recording beam towards the holographic recording medium as the reflected beam. In particular, the use of a transparent beam-guiding block substantially enhances the process stability by significantly reducing vibrations in the optical components used to generate the reflected beam. The use of a transparent beam-guiding block, inter alia, allows for the realization of a step-and-repeat recording process by laminating the recording film medium (transparent substrate and holographic recording medium) on the first facet as the beam entrance surface of the beam-guiding block. Preferably, the beam-guiding block is monolithic, i.e. it has no internal boundary surfaces.

The beam-guiding block may exhibit a large variety of geometrical shapes. According to a further embodiment of the present invention the beam-guiding block is designed such that at least one of the at least two further facets reflects the recording beam as the reflected beam by means of total internal reflection (TIR). Preferably, all facets reflect the recording beam within the beam-guiding block by TIR.

In the alternative, the beam-guiding block is designed such that at least one of the at least two further facets has a reflecting surface not requiring a TIR beam path. This can be achieved e.g. by applying a reflective coating to that facet.

According to a further embodiment of the present invention the wavelength of the recording beam is in the NIR-range. This allows free-space recordings of NIR reflectors or edge lit holograms, for free-space or lightguided eye tracking applications. It also allows reconstruction wavelengths far into a region of playback interest where NIR sensitized photopolymers do not exist.

According to a further embodiment of the present invention a plurality of laser beam sources is provided, the plurality of laser beam sources producing collinear recording beams. In particular, the collinear recording beams produced by the plurality of laser beam sources comprise at least two different wavelengths so as to produce in the holographic recording medium at least two different volume reflection holograms with substrate-guided RGB-reconstruction beams and/or substrate-guided RGB-diffraction beams. Accordingly, this allows for producing full colour volume reflection holograms as in-couplers (substrate-guided diffracted beams) or out-couplers (substrate-guided reconstructions beam) in lightguides.

As already mentioned, the method according to the invention has a special potential to be implemented in mass manufacturing of volume reflection holograms. In particular, it is possible to realize a step-and-repeat process in which the transparent substrate and/or the holographic recording medium is provided as roll-fed material.

According to a second aspect of the present invention the above-mentioned object and other objects are achieved by an apparatus for producing volume reflection holograms with substrate-guided reconstruction beams and/or substrate-guided diffracted beams in a single-beam set-up, the apparatus comprising:

at least one laser beam source, a reflector arrangement, wherein the at least one laser beam source and the reflector arrangement are arranged with respect to each other in such a way that a transparent substrate carrying a holographic recording medium may be arranged between that at least one laser source and the reflector arrangement, the substrate having a first flat side facing the at least one laser beam source and an second flat side facing the reflector arrangement. wherein the holographic recording medium is arranged on the first flat side or on the second flat side, wherein the at least one laser source is configured to produce a recording beam having a first wave vector.

wherein the beam path of the recording beam is configured such that the recording beam irradiates the holographic recording medium, passes through the holographic recording medium and is reflected by the reflector arrangement towards the holographic recording medium as a reflected beam having a second wave vector, wherein the beam path of the recording beam is further configured such that the reflected beam produces an interference pattern with the recording beam in the holographic recording medium, the interference pattern having the form of a grating having a grating vector, the grating vector being the difference vector of the wave vector of the reflected beam and the wave vector of the recording beam and the grating vector also being the difference vector of the wave vector of the diffracted beam and the wave vector of the reconstruction beam, and wherein a first plane spanned by the recording beam and the reflected beam is different from a second plane spanned by the reconstruction beam and the diffracted beam and wherein the grating vector of the grating is parallel to the line of intersection of the first and the second plane.

The apparatus according to the invention can be realized in a cost-efficient manner and ensures a production of volume reflection holograms with a high output. The specific advantages presented in connection with the method as described herein also apply to the apparatus as described herein.

According to an advantageous embodiment of the apparatus according to the invention the reflector arrangement is formed by a beam-guiding block, wherein the beam-guiding block is transparent for the recording beam and has a first facet configured to two-dimensionally contact the holographic recording medium and at least two further facets configured to reflect the recording beam towards the holographic recording medium as the reflected beam. This design ensures a very stable manufacturing process which, in particular, is insensitive to vibrations of the optical components involved. The beam-guiding block may have a large variety of geometries, in particular that of a polyhedron where one facet of the polyhedron forms the first facet contacting the holographic recording medium and further two facets reflecting the recording beam so as to form the reflecting beam. Preferably, the beam-guiding block is monolithic, i.e. it consist of one piece of transparent material. According to a further embodiment the material of the beam-guiding block is index-matched to the holographic recording medium. In accordance with the present disclosure "Index-matched" shall mean that the absolute value of the difference of the refractive index of the holographic recording medium and the refractive index of the material of the beam-guiding block is <0.1, preferably <0.05 and more preferably <0.02.

BRIEF DESCRIPTION OF THE DRAWINGS

The terms Fig., Figs., Figure, and Figures are used interchangeably in the specification to refer to the corresponding figures in the drawings.

There now are a number of possibilities for refining and developing the method and the apparatus according to the invention. To this end, reference is made, firstly, to the dependent patent claims, secondly, to the description of exemplary embodiments in conjunction with the drawing. In the drawing:

FIG. 5b shows an example of the recording of a volume reflection hologram in accordance with FIG. 5a in the identical geometrical configuration which is used for the reconstruction or playback of the volume reflection hologram, FIG. 5c shows an example of the recording of a volume reflection hologram in accordance with FIG. 5a in a modified configuration.

DETAILED DESCRIPTION

Figure 1:
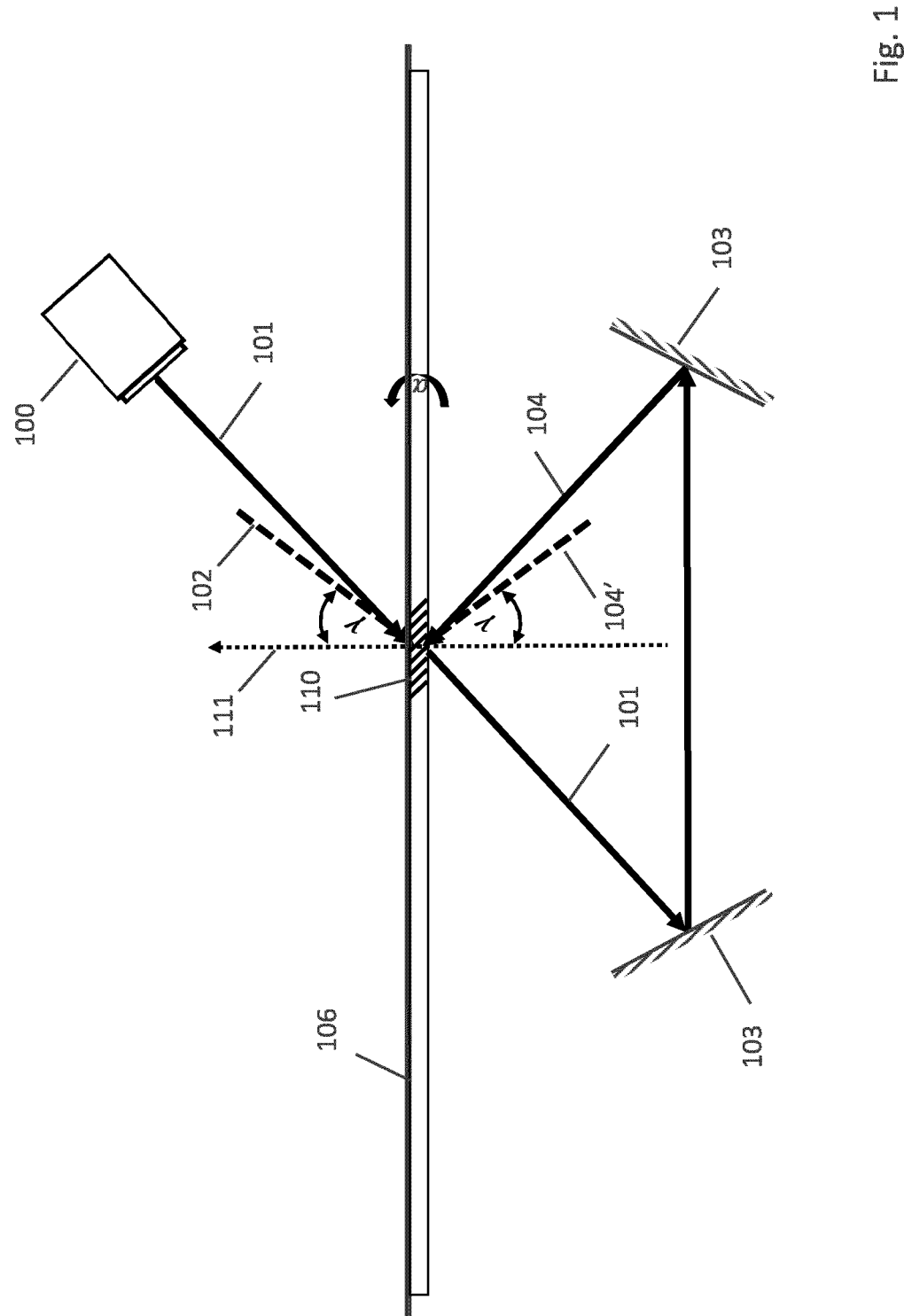
FIG. 1 shows an apparatus for producing volume reflection holograms with substrate-guided reconstruction beams and/or substrate-guided diffracted beams in a single-beam set-up in a first embodiment.

FIG. 1 shows the apparatus for producing volume reflection holograms with substrate-guided reconstruction beams and/or substrate-guided diffracted beams in a single-beam set-up in a first embodiment. 100 denotes a single frequency laser, emitting the recording beam 101 which exists in air and has a first wave vector. The recording beam 101 may be expanded to plane wave covering a certain cross section area perpendicular to the recording beams propagation direction by suitable optics (not shown). The recording beam 101 passes through a holographic recording medium 107 which, by way of example, may be a photopolymer. The holographic recording medium 107 is arranged on a transparent substrate 106, e.g. made of polycarbonate, cellulose tri-acetate or cyclo-olefinic copolymers. The transparent substrate 106 serves to mechanically support the holographic recording medium 107, presently the photopolymer layer. The transparent substrate 106 has a first flat side facing the laser beam source 100 and an second flat side facing away from the laser beam source 100. Presently, the holographic recording medium 107 is arranged on the second flat side of the substrate 106.

As the recording beam 101 irradiates the substrate 106 and the holographic recording medium 107 it is refracted by this optical coupling into the recording beam 102 with its propagation angle in the holographic recording medium 107 being measured towards its surface normal 111 denoted as γ. As mentioned above the recording beam 101 passes through the holographic recording medium 107 and is reflected twice by a reflector arrangement 103 arranged on the second flat side of the transparent substrate 106 to finally form the reflected beam 104 having a second wave vector. The reflected beam 104 passes through the holographic recording medium 107 as reflected beam 104'. In this specific case the propagation angle of the reflected beam 104' in the holographic recording medium 107 towards the surface normal 111 of the holographic recording medium 107 is again γ. The reflected beam 104' forms an interference pattern inside the holographic recording medium 107 with the recording beam 102 which via the recording process generates the volume Bragg grating structure 110 in the holographic recording medium 107.

Figure 2:
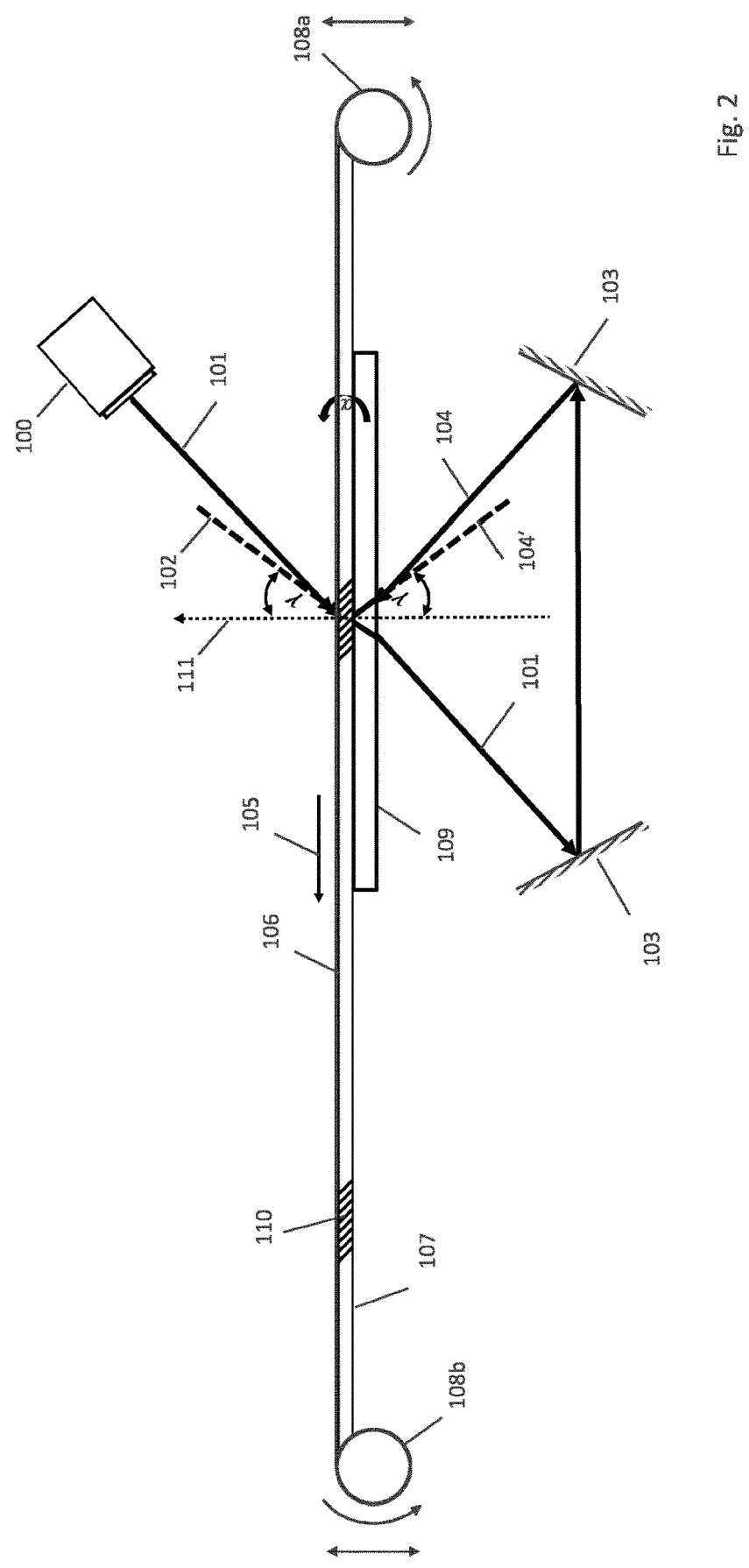
FIG. 2 shows an apparatus for producing volume reflection holograms with substrate-guided reconstruction beams and/or substrate-guided diffracted beams in a single-beam set-up in a second embodiment.

FIG. 2 shows an apparatus for producing volume reflection holograms with substrate-guided reconstruction beams and/or substrate-guided diffracted beams in a single-beam set-up in a second embodiment. In this second embodiment the method for producing volume reflection holograms with substrate-guided reconstruction beams and/or substrate-guided diffracted beams in a single-beam set-up is implemented as a step-and-repat process. For this, the holographic recording medium 107 arranged on the transparent substrate 106 is provided as a roll-fed material that is unwound from an unwinding roll 108a. In order to ensure a safe and reproducible recording process the holographic recording medium 107 is laminated to the flat surface of a transparent carrier element 109, e.g. a flat sheet of glass or another suitable transparent material, before recording. Except for the transparent carrier element 109 the beam path implemented in the embodiment shown in FIG. 2 corresponds to that of FIG. 1.

After the exposure and formation of the volume Bragg structure 110 the holographic recording medium 107 and the transparent substrate 106 are de-laminated from the surface of the transparent carrier element 109 by lifting up the unwinding roll 108a and the winding roll 108b in a controlled fashion. After that, by rotating the unwinding roll 108a and the winding roll 108b the holographic recording medium 107 together with the transparent substrate 106 moves to the left over a defined distance 105. After that step propagation the holographic recording medium 107 together with the transparent substrate 106 is re-laminated to the flat surface of the transparent carrier 109 by lowering down the unwinding roll 108a and the winding roll 108b in a controlled fashion. Controlled de-lamination and controlled re-lamination may be supported by additional rollers and tools not depicted here. During the exposure interval in which the holographic recording medium 107 is in optical contact with the surface of the transparent carrier 109, the recording beam 101 irradiates the holographic recording medium 107 thus facilitating the exposure and formation of the volume Bragg grating structure 110 by interference of recording beam 102 and reflected beam 104'. Before the start of the de-lamination, during the propagation of the holographic recording medium 107 together with the transparent substrate 106 along arrow 105 and until the finalization of the re-lamination the recording beam 101 may be blocked by e.g. a shutter (not shown in FIGS. 1 to 3). Through this a roll to roll step-and-repeat process for producing volume reflection holograms with substrate-guided reconstruction beams and/or substrate-guided diffracted beams in a single-beam set-up can be realized.

Figure 3:
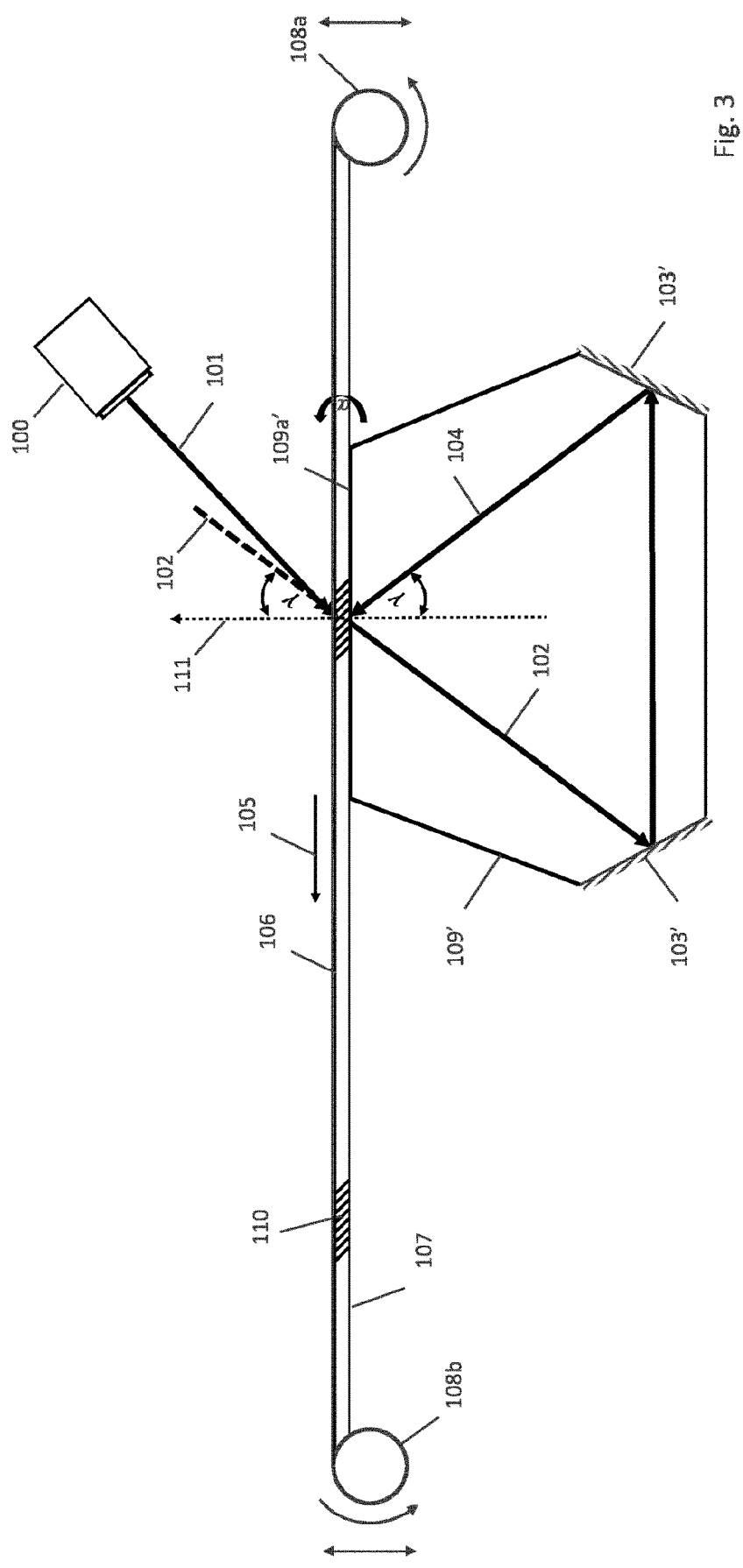
FIG. 3 shows an apparatus for producing volume reflection holograms with substrate-guided reconstruction beams and/or substrate-guided diffracted beams in a single-beam set-up in a third embodiment.

FIG. 3 shows an apparatus for producing volume reflection holograms with substrate-guided reconstruction beams and/or substrate-guided diffracted beams in a single-beam set-up in a third embodiment. In this embodiment the flat transparent carrier element 109 is replaced by a transparent beam guiding block 109' inside of which the recording beam 102 is reflected and redirected to the holographic recording medium 107 as the reflected beam 104. Accordingly, the holographic recording medium 107 is laminated, i.e. in two-dimensional contact, to a first facet 109a' of the beam-guiding block 109'. Preferably, the beam-guiding block 109' is monolithic, i.e. it is made of one piece of material and contains no internal boundary surfaces to ensure minimum loss of beam intensity. Furthermore, it is preferred that the beam-guiding block 109' is index matched to the holographic recording medium 107, i.e. the difference between the refractive index of the holographic recording medium and the beam-guiding block is <0.1, preferably <0.05 and more preferably <0.02. Presently, the recording beam 102 is reflected inside the beam-guiding block 109' on facets 103' which each have a reflective coating. Alternatively, the geometry of the beam-guiding block 109' may be such that the recording beam strikes the facets 103' in an angle greater than the critical angle so that reflection is effected by TIR. With the use of the beam-guiding block 109' the recording setup is highly insensitive to vibrations.

Figure 4B:
FIG. 4b shows a second way to change the grating slant angle by tilting the holographic recording medium.
Figure 4B:
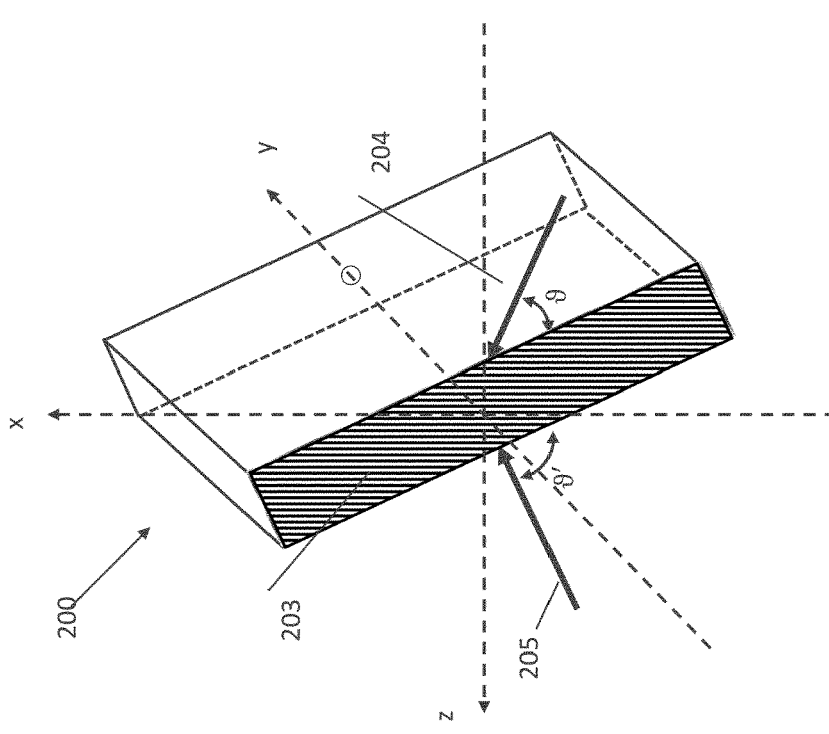
Figure 4A:
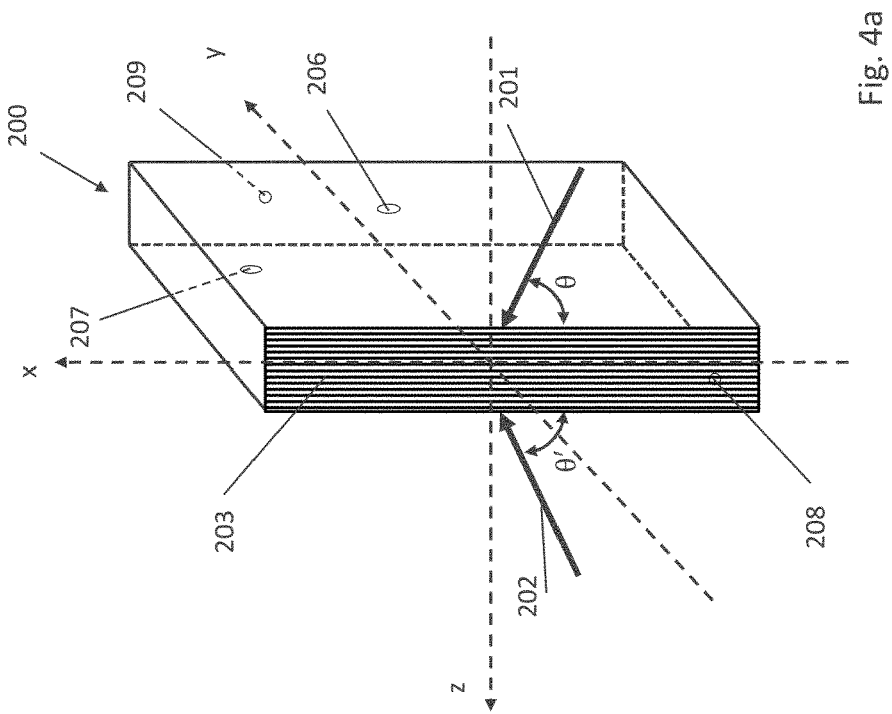
FIG. 4a shows a first way to record a volume reflection grating being able to vary the grating spacing and the slant angle of the grating.

FIG. 4a shows a first way to record a volume reflection grating, where the grating spacing and the slant angle of the grating may be varied. The recording beam with a first wave vector 201 which is located in the x-z-plane, enters the holographic recording medium 200 with an angle θ (inside the holographic recording medium) measured towards the first surface 206 (x-y-plane) of the holographic recording medium 200. The reflected beam with a second wave vector 202 has the identical length as the first wave vector 201 with an angle θ' measured towards a second surface 207 (x-y-plane) of the recording medium 200. It is to be noted that both angles θ and θ' are measured inside the holographic recording medium (and not in air). The reflected beam (wave vector 202) produces an interference pattern together with the recording beam (wave vector 201) in the holographic recording medium 200, the interference pattern having the form of a grating 203 with a grating vector K. The grating vector K (not shown in FIG. 4a) is the difference vector of the wave vector 202 of the reflected beam and the wave vector 201 of the recording beam (e.g. vector 305 in FIGS. 5b and 5c). The length of the grating vector K is related to the grating period Λ via K=2·π/Λ.

If θ and θ' are of identical size (as shown in FIG. 4a) the grating planes are parallel to both surfaces 206, 207 of the holographic recording medium 200. The grating period A can be modified by θ and θ' and the identical length k of the first and second wave vector 201, 202 defined as k=2·π·n/λ, n denoting the index of refraction of the holographic recording medium 200 and λ denoting the identical vacuum wavelength of the recording beam (wave vector 201) and the reflected beam (wave vector 202). If θ and θ' are of different size the grating planes are inclined (slanted) towards both surfaces 206, 207 of the holographic recording medium 200.

The grating vector being the difference vector of the wave vector 202 of the reflected beam and the wave vector 201 of the recording beam can be generated by a multitude of pairs of recording beams and reflected beams having wave vectors of pairwise identical lengths and respective angles θ and θ' chosen such that the identical grating vector is generated by each pair of a recording beam and reflected beam. The multitude of pairs of recording beams and reflecting beams are all located in a common plane.

FIG. 4b shows a further way to change the grating slant angle by tilting the holographic recording medium 200 via a rotation around an axis parallel to the y-axis (presently the rotation axis is identical with the y-axis) and perpendicular to the common plane comprising the multitude of pairs of recording beams and reflected beams being able to generate the identical grating vector with their respective pairs of incident angles ϑ and ϑ'.

Using this scheme of having all pairs of recording beams and reflected beams, that generate the identical grating vector, located in a common plane, however, limits the ability to choose the first wave vector 201 and the second wave vector 202 in such a way that both wave vectors 201, 202 are able to exist in free space like air or vacuum (cos θ and cos θ'<1/n, n being the refractive index of the holographic recording medium 200) and at the same time have a vacuum wavelength that is able to address the part of the spectrum in which the holographic recording medium 200, preferably a photopolymer, shows recording sensitivity or have a vacuum wavelength for which single frequency laser sources exist. The limitations become even more severe if not only one grating vector is involved, but more than one grating vector like in, for example, the simultaneous, coaligned wavelength multiplexed recording of volume reflection gratings in the same volume of the holographic recording medium.

Figure 5A:
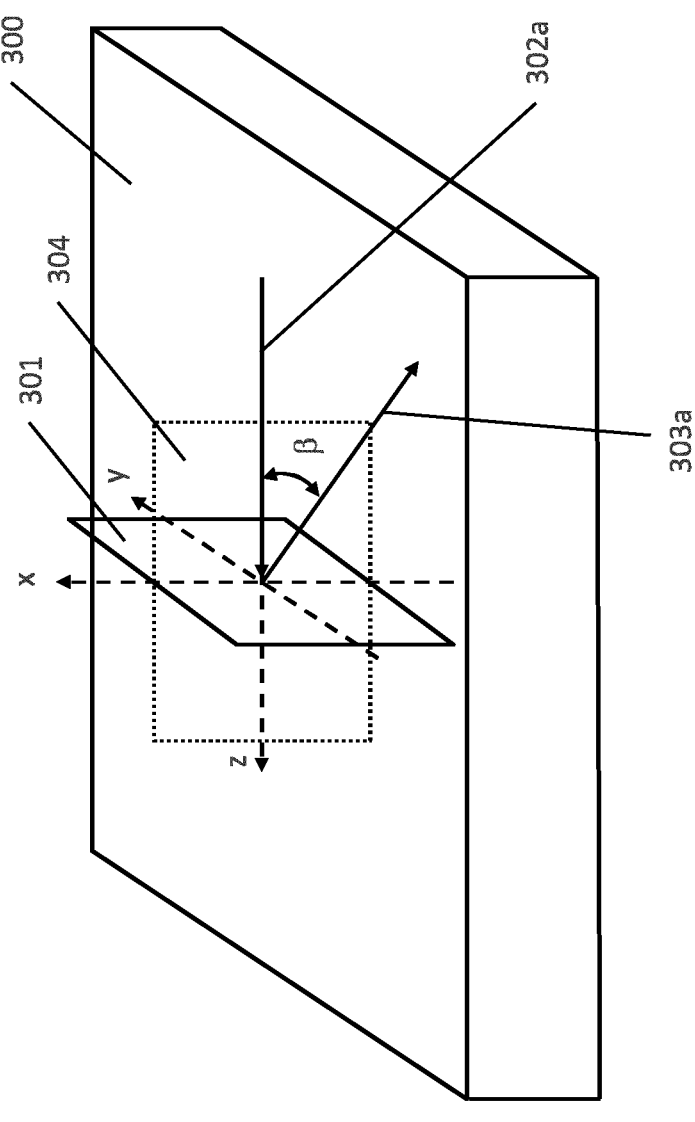
FIG. 5a shows an example of the reconstruction or playback of a volume reflection hologram generated in accordance with the present invention.

FIG. 5a shows an example of the reconstruction or playback of a volume reflection hologram as part of an embodiment of the invention. In this case 300 denotes a reference plane which could be the optical table used for exposing the volume reflection hologram in which a right handed coordinate system x, y, z is fixed. 301 denotes the plane of the holographic recording medium. Plane 301 is located in the x-y plane of the fixed coordinate system and the reconstruction beam 302a exists in air or vacuum. The wave vector 302a of the reconstruction beam is parallel to the z-axis and the reconstruction beam impinges perpendicular on the holographic recording medium located in plane 301 as shown in FIG. 5a. The wave vector of the diffracted beam is denoted as 303a and is located in the x-z plane 304. The diffracted beam (wave vector 303a) is generated by the interaction of the reconstruction beam (wave vector 302a) with the volume reflection hologram (not shown) recorded in the holographic recording medium which in turn is located in plane 301. In this example the angle β, measured inside the holographic recording medium, is greater than the critical angle so that the diffracted beam is substrate-guided in the holographic recording medium having the average refractive index n. i.e. it propagates through the holographic recording medium via TIR. The wave vector 303a of the diffracted beam is located in the x-z plane 304.

Figures 5B, 5C:
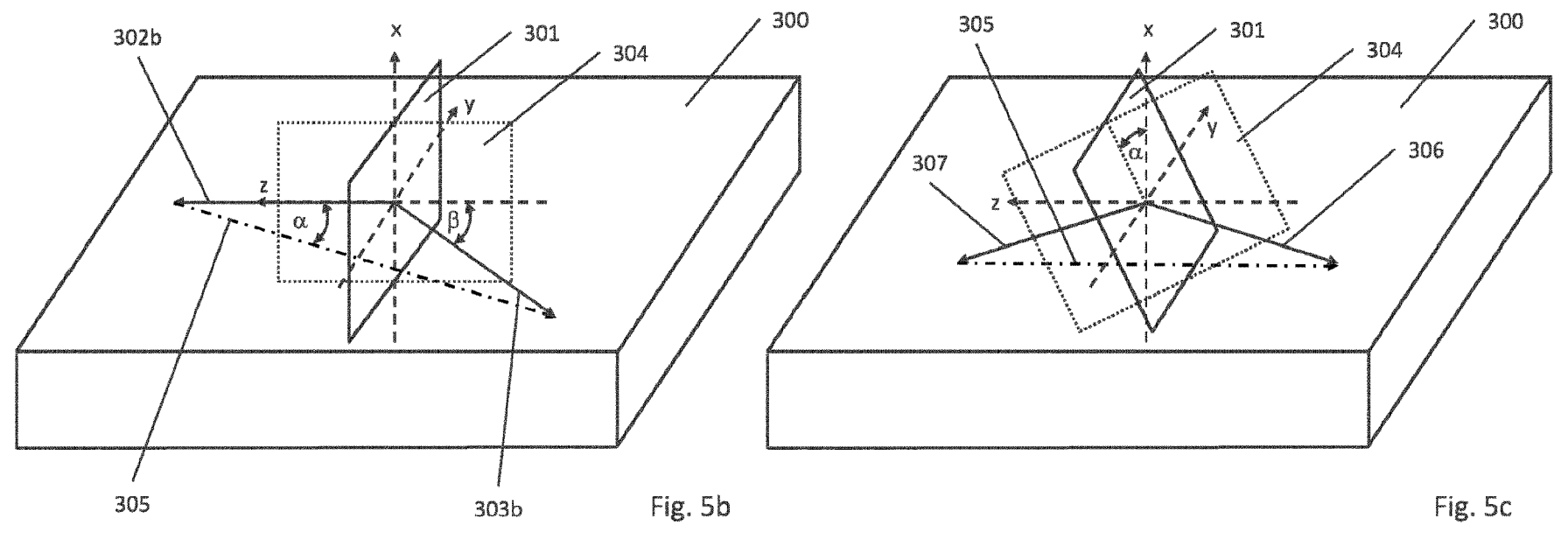

FIG. 5b shows an example of the recording of a volume reflection hologram in accordance with FIG. 5a in the identical geometrical configuration which is used for the reconstruction or playback of the volume reflection hologram. This means the wave vector 302a of the reconstruction beam in FIG. 5a is identical to the wave vector 302b of the recording beam and the wave vector 303a of the diffracted beam in FIG. 5a is identical to the wave vector 303b of the reflected beam in FIG. 5b. The grating vector 305 characterizing the volume Bragg grating (not shown in FIG. 5a) is generated as the difference vector of the wave vector 303b of the reflected beam and the wave vector 302b of the recording beam. The identical grating vector 305 is also given as the difference vector of the wave vector 303a of the diffracted beam and the wave vector 302a of the reconstruction beam (each in FIG. 5a). The grating vector 305 as well as the wave vector 303a of the diffracted beam, the wave vector 302a of the reconstruction beam, the wave vector 303b of the reflected beam and the wave vector 302b of the recording beam are each located in the x-plane 304. The grating vector 305 is inclined by an angle α measured inside the holographic recording medium towards the z-axis of the fixed coordinate system. The reconstruction beam (wave vector 302a) and the recording beam (wave vector 302b) can exist in air or vacuum (free space) whereas the diffracted beam (wave vector 303a) and the reflected beam (wave vector 303b) are substrate-guided which is undesirable for the recording. The first plane spanned by the recording beam (wave vector 302b) and the reflected beam (wave vector 303b) is identical to the second plane spanned by the reconstruction beam (wave vector 302a) and the diffracted beam (wave vector 302a) and coincides with the x-z plane 304.

FIG. 5c shows an example of the recording of a volume reflection hologram depicted in FIG. 5a in accordance with the present invention. In order to overcome the physical constraint that the diffracted beam (wave vector 303a) and the reflected beam (wave vector 303b) described in FIG. 5a and FIG. 5b are substrate-guided, the Bragg match recording of the grating vector 305 can be done differently. At first the plane of the holographic recording medium 301 may be tilted by an angle & using a rotation around the y-axis (this is also indicated by angle α in FIG. 1-3) to become plane 301'. Through this the desired gating vector 305 fixed inside the coordinate system of the holographic recording medium is now located in the y-z plane of the fixed coordinate system belonging to the reference plane 300 and parallel to the z-axis. Hereby a wave vector 307 of a new recording beam and a wave vector 306 of a new reflected beam may be chosen, both wave vectors 306, 307 having the identical length and both located in the y-z plane of the fixed coordinate system belonging to the reference plane 300. The grating vector 305 becomes the difference vector of the wave vector 306 of the new reflected beam and the wave vector 307 of the new recording beam. Moreover, by choosing the common length of the wave vectors 306 and 307 (for example by a proper choice of the vacuum wavelength) of the new reflected beam and the new recording beam the new reflected and the new recording beam can exist in air or vacuum (free space) and thus a substrate-guided recording and/or reflected beam is avoided. In this example of an embodiment of the invention the first plane spanned by the new recording beam and the new reflected beam (wave vectors 307, 306) is different to the second plane spanned by the reconstruction beam and the diffracted beam (wave vectors 302a, 303a) and the grating vector of the grating (305) is parallel to the intersection line of the first plane and the second plane.

Figure 6:
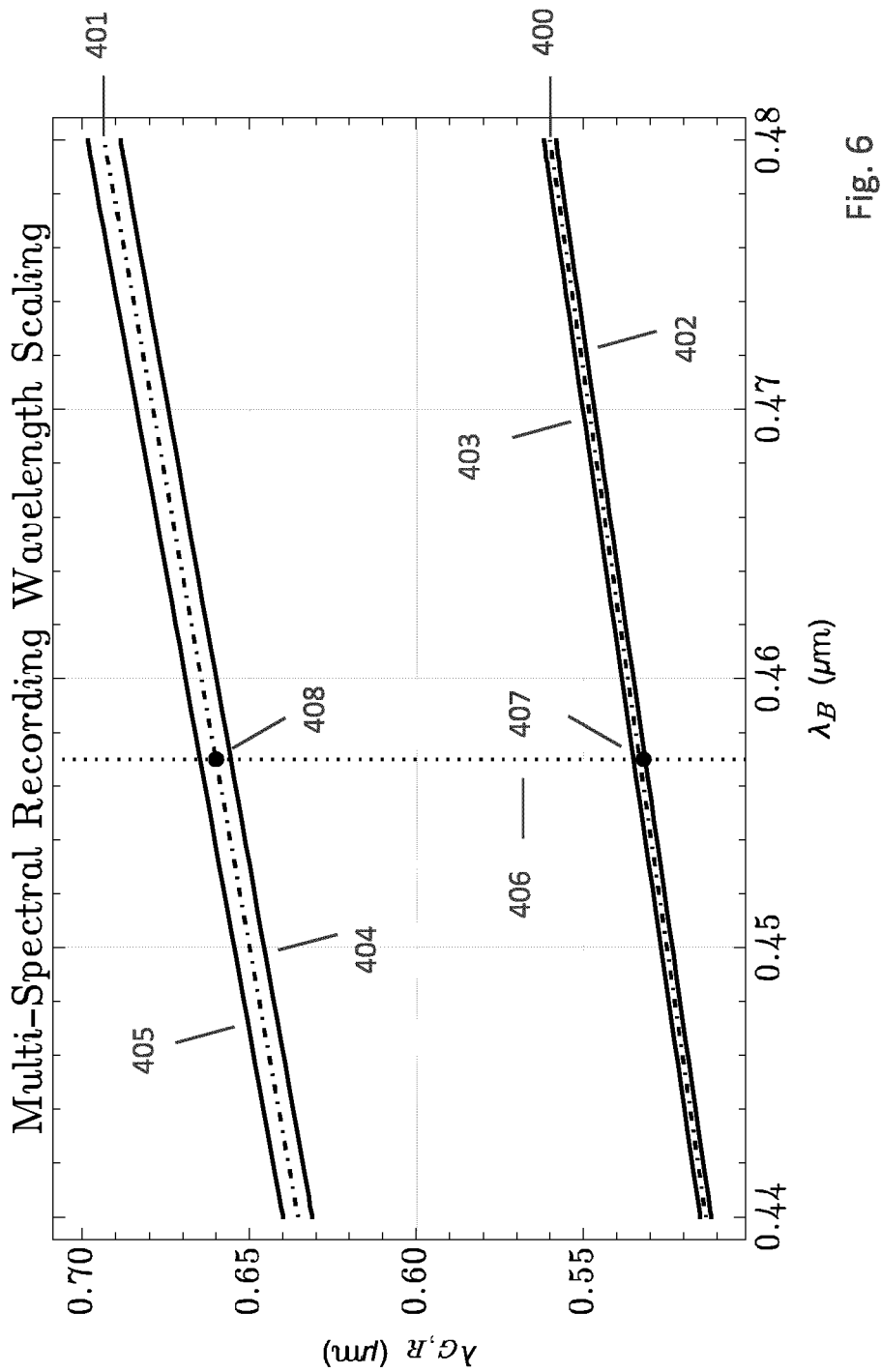
FIG. 6 shows a diagram that illustrates the interdependence of different recording wavelengths of a multi-spectral Bragg matched recording setup.

As shown in FIG. 6a relationship exists between the playback and recording wavelengths of a multi-spectral Bragg matched recording, red, green, and blue for example, to ensure collinearity of the respective beam paths in the recording medium and the reflection arrangement, in particular in case a beam-guiding block is used (as shown in FIG. 3). The x-axis of FIG. 6 represents a range of recording wavelengths in the blue spectral range (440 to 480 nm), and the y-axis represents a range of recording wavelengths from blue to deep red (500 nm to 700 nm) that will depend on the choice of the blue recording wavelength (a value on the x-axis). The dependence of the recording wavelengths in FIG. 6 are calculated from playback wavelengths that lie somewhere in a typical range for RGB scanning projectors, 450 nm, 525 nm, and 650 nm as qualitatively shown in FIG. 5a-c. The calculations are based on the formalism of energy and momentum conservation applied to the field of diffraction of light. Dashed lines 400 and 401 are the calculated recording wavelengths for green and red as a function of a chosen blue recording wavelength, in this case in the range of 440 nm to 480 nm, for a collinear RGB recording. To better illustrate the dependence of the recording wavelength as function of playback wavelength line 402 and 404 are the calculated recording wavelengths for 440 nm. 515 nm, and 640 nm playback wavelengths. Line 403 and 405 are the calculated recording wavelengths for 460 nm. 535 nm, and 660 nm playback wavelengths. Line 406 represents a choice for a blue recording wavelength that corresponds to a common fixed frequency laser source at 457 nm. The points 407 and 408 represent common fixed frequency laser sources in the green and red. 532 nm and 660 nm respectively. If 407 and 408 lies on or very near 400 and 401, along

406, then a collinear recording can be successful with the respective fixed frequency laser. 408 would satisfy this requirement for the playback wavelengths corresponding to 400 and 401. With flexibility in playback wavelengths and the choice of commonly available fixed frequency lasers one could potentially find a combination where one or more fixed frequency lasers could be used. With the development of high-power tunable laser sources all recording wavelength requirements can be satisfied, and hence a collinear RGB recording in the described Bragg matching technique.

The invention claimed is:

1. A method for producing volume reflection holograms with substrate-guided reconstruction beams and/or substrate-guided diffracted beams in a single-beam set-up, comprising:

providing at least one laser beam source producing a recording beam having a first wave vector, providing a holographic recording medium on a transparent substrate, the substrate having a first flat side facing the at least one laser beam source and a second flat side facing away from the at least one laser beam source, wherein the holographic recording medium is arranged on the first flat side or on the second flat side, and providing a reflector arrangement arranged on the second flat side of the substrate, wherein the recording beam irradiates the holographic recording medium, wherein the recording beam passes through the holographic recording medium and the substrate, and is reflected by the reflector arrangement towards the holographic recording medium and the substrate as a reflected beam having a second wave vector, wherein the reflected beam produces an interference pattern with the recording beam in the holographic recording medium, the interference pattern having the form of a grating having a grating vector, the grating vector being the difference vector of the second wave vector of the reflected beam and the first wave vector of the recording beam, and the grating vector also being identical to the difference vector of a wave vector of a diffracted beam and a wave vector of a reconstruction beam, and wherein a first plane spanned by the recording beam and the reflected beam is different from a second plane spanned by the reconstruction beam and the diffracted beam, and wherein the grating vector of the grating is parallel to the line of intersection of the first plane and the second plane.

2. The method according to claim 1, wherein the reflector arrangement comprises at least two reflecting elements.

3. The method according to claim 1, wherein the beam path of the recording beam and the beam path of the reflected beam are arranged in a free-space configuration in air or in vacuum.

4. The method according to claim 1, wherein the holographic recording medium is arranged on the second flat side of the substrate and wherein the reflector arrangement is formed by a beam-guiding block, wherein the beam-guiding block is transparent for the recording beam and has a first facet two-dimensionally contacting the holographic recording element and at least two further facets reflecting the recording beam towards the holographic recording medium and the substrate as the reflected beam.

5. The method according to claim 4, wherein the beam-guiding block is designed such that at least one of the at least two further facets reflects the recording beam as the reflected beam by means of total internal reflection (TIR).

6. The method according to claim 4, wherein the beam-guiding block is designed such that at least one of the at least two further facets has a reflecting surface not requiring a TIR beam path.

7. The method according to claim 4, wherein the material of the beam-guiding block is index-matched to the holographic recording medium.

8. The method according to claim 4, wherein the wavelength of the recording beam is in the NIR-range.

9. The method according to claim 1, wherein a plurality of laser beam sources is provided, the plurality of laser beam sources producing collinear recording beams.

10. The method according to claim 9, wherein the collinear recording beams produced by the plurality of laser beam sources comprise at least two different wavelengths so as to produce in the holographic recording medium at least two different volume reflection holograms with substrate-guided RGB-reconstruction beams and/or substrate-guided RGB-diffraction beams.

11. The method according to any claim 1, wherein the method is carried out in a step-and-repeat process.

12. The method according to claim 11, wherein at least the substrate carrying the holographic recording medium and/or the holographic recording medium is a roll-fed material.

13. An apparatus for producing volume reflection holograms with substrate-guided reconstruction beams and/or substrate-guided diffracted beams in a single-beam set-up, comprising:

at least one laser beam source, and a reflector arrangement, wherein the at least one laser beam source and the reflector arrangement are arranged with respect to each other in such a way that a transparent substrate carrying a holographic recording medium may be arranged between the at least one laser beam source and the reflector arrangement, the substrate having a first flat side facing the at least one laser beam source and a second flat side facing the reflector arrangement, wherein the holographic recording medium is arranged on the first flat side or on the second flat side, wherein the at least one laser beam source is configured to produce a recording beam having a first wave vector, wherein the beam path of the recording beam is configured such that the recording beam irradiates the holographic recording medium, passes through the holographic recording medium and is reflected by the reflector arrangement towards the holographic recording medium as a reflected beam having a second wave vector, wherein the beam path of the recording beam is further configured such that the reflected beam produces an interference pattern with the recording beam in the holographic recording medium, the interference pattern having the form of a grating having a grating vector, the grating vector being the difference vector of the second wave vector of the reflected beam and the first wave vector of the recording beam, and the grating vector also being the difference vector of a wave vector of a diffracted beam and a wave vector of a reconstruction beam, and wherein a first plane spanned by the recording beam and the reflected beam is different from a second plane spanned by the reconstruction beam and the diffracted beam, and wherein the grating vector of the grating is parallel to the line of intersection of the first plane and the second plane.

14. The apparatus according to claim 13, wherein the reflector arrangement is formed by a beam-guiding block, wherein the beam-guiding block is transparent for the recording beam and has a first facet configured to two-dimensionally contact the holographic recording medium and at least two further facets configured to reflect the recording beam towards the holographic recording medium as the reflected beam.

15. The method according to claim 14, wherein the material of the beam-guiding block is index-matched to the holographic recording medium.

* * * * *